United States Patent [19]
Willett et al.

[11] Patent Number: 6,088,067
[45] Date of Patent: *Jul. 11, 2000

[54] LIQUID CRYSTAL DISPLAY PROJECTION SYSTEM USING MULTILAYER OPTICAL FILM POLARIZERS

[75] Inventors: Stephen J. Willett, St. Paul; Michael F. Weber, Shoreview; Andrew J. Ouderkirk, Woodbury, all of Minn.; James M. Jonza, Round Rock, Tex.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/494,978
[22] Filed: Jun. 26, 1995

[51] Int. Cl.[7] .................................................. G02F 1/1335
[52] U.S. Cl. .................................. 349/5; 349/61; 349/96; 349/117; 359/494
[58] Field of Search ........................... 349/61, 62, 5, 349/6, 96, 105; 359/494, 495, 497, 498, 500, 586, 589; 353/122, 119, DIG. 3, DIG. 5

[56] References Cited

U.S. PATENT DOCUMENTS

| | | | |
|---|---|---|---|
| Re. 34,605 | 5/1994 | Schrenk et al. | 359/359 |
| 1,610,423 | 12/1926 | Cawley | 353/20 |
| 2,492,809 | 12/1949 | Marks | 88/65 |
| 2,887,566 | 5/1959 | Marks | 240/9.5 |
| 3,124,639 | 3/1964 | Kahn | 88/65 |
| 3,213,753 | 10/1965 | Rogers | 88/65 |
| 3,528,723 | 9/1970 | Rogers | 350/157 |
| 3,610,729 | 10/1971 | Rogers . | |
| 3,647,612 | 3/1972 | Schrenk et al. | 161/165 |
| 3,711,176 | 1/1973 | Alfrey, Jr. et al. | 350/1 |

(List continued on next page.)

FOREIGN PATENT DOCUMENTS

| | | | |
|---|---|---|---|
| 1327286 | 3/1994 | Canada | 88/113.18 |
| 218041 | 12/1993 | China | G02F 1/1335 |
| 062751 | 10/1981 | European Pat. Off. | G02B 1/08 |
| 056843 | 8/1982 | European Pat. Off. | G02F 1/133 |
| 469732 | 7/1991 | European Pat. Off. . | |
| 0 460 241 A1 | 12/1991 | European Pat. Off. . | |
| 514223 | 5/1992 | European Pat. Off. | G02B 5/08 |
| 0 488 544 A1 | 6/1992 | European Pat. Off. . | |
| 0 492 636 A1 | 7/1992 | European Pat. Off. . | |
| 552725 | 7/1993 | European Pat. Off. | G02B 27/28 |

(List continued on next page.)

OTHER PUBLICATIONS

"23:3: Retroreflecting Sheet Polarizer," M. F. Weber, *SID 92 DIGEST*, pp. 427–429.
"P–61: Retroreflecting Sheet Polarizer," M. F. Weber, *SID 93 DIGEST*, pp. 669–672.

(List continued on next page.)

*Primary Examiner*—Kenneth Parker
*Assistant Examiner*—Tai V. Duong
*Attorney, Agent, or Firm*—William D. Miller

[57] ABSTRACT

A liquid crystal display (LCD) projection system including a projection panel, a light source, and a reflector. The projection panel includes an LCD and a polarizer on one side of the LCD and a reflective polarizer on the other side. The reflective polarizer is a multilayer stack of pairs of adjacent material layers. Each of the layer pairs exhibits a refractive index difference between the adjacent layers in a first direction in the plane of the reflective polarizer and exhibits essentially no refractive index difference between adjacent layers in a second direction in the plane of the reflective polarizer and orthogonal to the first direction. A quarter-wave plate is secured to the reflective polarizer. Light rays from the light source either pass through the reflective polarizer, and on to the LCD, or are reflected back toward the light source, depending on their polarization. Light which is reflected by the reflective polarizer is reflected by the reflector back toward the LCD again. The use of the quarter-wave plate and the reflector help to recycle what would typically be regarded as wasted light, while at the same time reducing heat build-up within the LCD.

19 Claims, 9 Drawing Sheets

6,088,067
Page 2

U.S. PATENT DOCUMENTS

| | | |
|---|---|---|
| 3,759,647 | 9/1973 | Schrenk et al. .......................... 425/131 |
| 3,773,882 | 11/1973 | Schrenk ................................. 264/171 |
| 3,801,429 | 4/1974 | Schrenk et al. .......................... 161/181 |
| 3,860,036 | 1/1975 | Newman, Jr. ............................. 138/45 |
| 4,025,688 | 5/1977 | Nagy et al. ............................. 428/350 |
| 4,094,947 | 6/1978 | Alfrey, Jr. et al. ...................... 264/171 |
| 4,268,127 | 5/1981 | Oshima et al. .......................... 350/337 |
| 4,310,584 | 1/1982 | Cooper et al. ........................... 428/212 |
| 4,315,258 | 2/1982 | McKnight et al. ....................... 340/784 |
| 4,427,741 | 1/1984 | Aizawa et al. .......................... 428/332 |
| 4,446,305 | 5/1984 | Rogers et al. . |
| 4,520,189 | 5/1985 | Rogers et al. .......................... 528/331 |
| 4,521,588 | 6/1985 | Rogers et al. .......................... 528/363 |
| 4,525,413 | 6/1985 | Rogers et al. .......................... 428/212 |
| 4,540,623 | 9/1985 | Im et al. ................................. 428/220 |
| 4,678,285 | 7/1987 | Ohta et al. .............................. 350/345 |
| 4,720,426 | 1/1988 | Englert et al. ........................... 428/344 |
| 4,756,953 | 7/1988 | Utsumi . |
| 4,772,098 | 9/1988 | Ogawa . |
| 4,796,978 | 1/1989 | Tanaka et al. ........................... 350/337 |
| 4,798,448 | 1/1989 | van Raalte .............................. 350/345 |
| 4,917,465 | 4/1990 | Conner et al. ........................... 350/335 |
| 4,937,134 | 6/1990 | Schrenk et al. .......................... 428/213 |
| 4,952,925 | 8/1990 | Haastert . |
| 4,989,076 | 1/1991 | Owada et al. ............................. 358/61 |
| 5,032,021 | 7/1991 | Kanatani et al. . |
| 5,042,921 | 8/1991 | Sato et al. . |
| 5,089,318 | 2/1992 | Shetty et al. ............................ 428/212 |
| 5,094,788 | 3/1992 | Schrenk et al. . |
| 5,094,793 | 3/1992 | Schrenk et al. . |
| 5,095,210 | 3/1992 | Wheatley et al. ........................ 250/339 |
| 5,103,337 | 4/1992 | Schrenk et al. .......................... 359/359 |
| 5,122,905 | 6/1992 | Wheatley et al. ........................ 359/586 |
| 5,122,906 | 6/1992 | Wheatley . |
| 5,124,841 | 6/1992 | Oishi . |
| 5,126,880 | 6/1992 | Wheatley et al. . |
| 5,149,578 | 9/1992 | Wheatley et al. ........................ 428/213 |
| 5,157,526 | 10/1992 | Kondo et al. . |
| 5,159,478 | 10/1992 | Akiyama et al. .......................... 359/69 |
| 5,170,194 | 12/1992 | Kurematsu et al. . |
| 5,188,760 | 2/1993 | Hikmet et al. ........................ 252/299.01 |
| 5,202,074 | 4/1993 | Schrenk et al. .......................... 264/241 |
| 5,211,878 | 5/1993 | Reiffenrath et al. ................. 252/299.63 |
| 5,217,794 | 6/1993 | Schrenk ................................. 428/220 |
| 5,233,465 | 8/1993 | Wheatley et al. ........................ 359/359 |
| 5,234,729 | 8/1993 | Wheatley et al. ......................... 428/30 |
| 5,235,443 | 8/1993 | Barnik et al. ............................. 359/37 |
| 5,255,029 | 10/1993 | Vogeley et al. .......................... 353/122 |
| 5,260,730 | 11/1993 | Williams et al. . |
| 5,269,995 | 12/1993 | Ramanathan et al. . |
| 5,278,694 | 1/1994 | Wheatley et al. ........................ 359/359 |
| 5,282,121 | 1/1994 | Bornhorst et al. . |
| 5,294,657 | 3/1994 | Melendy et al. ......................... 524/270 |
| 5,316,703 | 5/1994 | Schrenk ................................. 264/1.3 |
| 5,319,478 | 6/1994 | Fijnfschilling et al. .................... 359/53 |
| 5,325,218 | 6/1994 | Willett et al. ............................. 359/40 |
| 5,333,072 | 7/1994 | Willett .................................... 349/57 |
| 5,339,198 | 8/1994 | Wheatly et al. .......................... 359/359 |
| 5,359,691 | 10/1994 | Tai et al. ................................. 385/146 |
| 5,389,324 | 2/1995 | Lewis et al. ............................. 264/171 |
| 5,422,786 | 6/1995 | Weber . |
| 5,424,119 | 6/1995 | Phillips et al. ........................... 428/328 |
| 5,448,404 | 9/1995 | Schrenk et al. .......................... 359/584 |
| 5,451,449 | 9/1995 | Shetty et al. ............................ 428/195 |
| 5,486,935 | 1/1996 | Kalmanash ............................... 359/37 |
| 5,486,949 | 1/1996 | Schrenk et al. .......................... 359/498 |
| 5,540,978 | 7/1996 | Schrenk ................................. 428/212 |
| 5,552,927 | 9/1996 | Wheatly et al. .......................... 359/359 |
| 5,559,634 | 9/1996 | Weber .................................... 359/638 |
| 5,568,316 | 10/1996 | Schrenk et al. .......................... 359/584 |
| 5,612,820 | 3/1997 | Schrenk et al. .......................... 359/498 |
| 5,629,055 | 5/1997 | Revol et al. .............................. 428/1 |
| 5,686,979 | 11/1997 | Weber et al. ............................. 349/96 |
| 5,699,188 | 12/1997 | Gilbert et al. ........................... 359/584 |
| 5,721,603 | 2/1998 | De Vaan et al. ......................... 349/194 |
| 5,744,534 | 4/1998 | Ishiharada et al. ...................... 524/442 |
| 5,751,388 | 5/1998 | Larson ..................................... 349/96 |
| 5,767,935 | 6/1998 | Ueda et al. .............................. 349/112 |
| 5,770,306 | 6/1998 | Suzuki et al. ............................ 428/328 |
| 5,783,120 | 7/1998 | Ouderkirk et al. ....................... 264/134 |
| 5,793,456 | 8/1998 | Broer et al. ............................... 349/98 |
| 5,808,794 | 9/1998 | Weber et al. ............................ 359/487 |
| 5,825,542 | 10/1998 | Cobb, Jr. et al. ........................ 359/487 |
| 5,825,543 | 10/1998 | Ouderkirk et al. ....................... 359/494 |

FOREIGN PATENT DOCUMENTS

| | | |
|---|---|---|
| 0 573 905 A1 | 12/1993 | European Pat. Off. . |
| 0 597 261 A1 | 5/1994 | European Pat. Off. . |
| 0 606 939 A1 | 7/1994 | European Pat. Off. . |
| 0 606 940 A2 | 7/1994 | European Pat. Off. . |
| 4121861 | 1/1992 | Germany .......................... G02B 5/30 |
| 63-017023 | 1/1988 | Japan . |
| 63-181201 | 7/1988 | Japan ............................... F21V 5/02 |
| 4-141603 | 5/1992 | Japan . |
| 4-184429 | 7/1992 | Japan . |
| 5-288910 | 11/1993 | Japan ............................... G02B 5/18 |
| 6-11607 | 1/1994 | Japan ............................... G02B 5/18 |
| 2052779 | 5/1980 | United Kingdom ............ G02F 1/133 |
| WO 91/09719 | 7/1991 | WIPO ............................. B29C 43/20 |
| WO 92/22838 | 12/1992 | WIPO . |
| WO 94/11776 | 5/1994 | WIPO . |
| WO 94/29765 | 5/1994 | WIPO ............................. G02F 1/1335 |
| WO 95/27919 | 4/1995 | WIPO ............................. G02B 27/28 |
| WO 95/17303 | 6/1995 | WIPO ............................. B32B 7/02 |
| WO 95/17691 | 6/1995 | WIPO ............................. G02B 5/30 |
| WO 95/17692 | 6/1995 | WIPO . |
| WO 95/17699 | 6/1995 | WIPO ............................. G02F 1/1335 |
| WO 96/19347 | 6/1996 | WIPO ............................. B32B 7/02 |
| WO 97/01440 | 1/1997 | WIPO ............................. B32B 27/36 |
| WO 97/01774 | 1/1997 | WIPO ............................. G02B 1/10 |
| WO 97/32226 | 9/1997 | WIPO ............................. G02B 5/30 |

OTHER PUBLICATIONS

Alfrey, T. et al., "Physical Optics of Iridescent Multilayered Plastic Films", *Polymer Engineering and Science,* vol. 9, No. 6, p. 400–4 (Nov. 1969).

Hodgkinson, I. et al., "Effective Principal Refractive Indices and Column Angles for Periodic Stacks of Thin Birefringent Films", *J. Opt. Soc. Am. A,* vol. 10, No.9, p. 2065–71 (1993).

Im, J. et al., "Coextruded Microlayer Film and Sheet", *Journal of Plastic Film and Sheeting,* vol. 4, p. 104–5 (Apr., 1988).

MacLeod, H.A., *Thin Film Optical Filters,* Adam Hilger Ltd.: London (1969).

Radford, J. et al., "Reflectivity of Iridescent Coextruded Multilayered Plastic Films", *Polymer Engineering and Science,* vol. 13, No. 3, p. 216–21 (May 1973).

Schrenk, W. et al., "Coextruded Iridescent Film", TAPPI Paper Synthetics Conference, Atlanta, Georgia, p. 141–5 (Sep. 27–29, 1976).

Schrenk et al., "Interfacial Flow Instability in Multilayer Coextrusion", *Polymer Engineering and Science,* vol. 18 (8), p. 620–3 (Jun. 1978).

Schrenk et al., "Coextruded Multilayer Polymer Films and Sheet", *Polymer Blends,* Ch. 15, vol. 2, 129, Academic Press, Inc., p. 129–65 (1978).

Schrenk, W. et al., "Coextruded Elastomeric Optical Interference Film", SPE Annual Technical Conference, Atlanta, GA, p. 1703–7 (1988).

Schrenk, W., "New Developments in Coextrusion", International Conference on Advances in Polymer Processing, New Orleans, LA, (Apr. 2–4, 1991).

Schrenk, W. et al., "Coextruded Infrared Reflecting Films", 7th Annual Meeting Polymer Processing Society, Hamilton, Ontario, Canada, p. 222–3 (Apr. 1991).

Wu et al., "High Transparent Sheet Polarizer Made with Birefringent Materials", *Jpn. J. Appl. Phys..* vol. 34, Pt. 2, No. 8A, p. L997–99 (Aug. 1995).

Schrenk et al., Nanolayer polymeric optical films, Tappi Journal, pp. 169–174, Jun., 1992.

LIQUID CRYSTAL DISPLAY PROJECTION SYSTEM USING MULTILAYER OPTICAL FILM POLARIZERS

FIELD OF THE INVENTION

The present invention relates generally to liquid crystal display projection systems and, more specifically, to such systems which incorporate multilayer optical film polarizers.

BACKGROUND OF THE INVENTION

Liquid crystal display (LCD) projection systems offer the advantages of large image areas, compactness, ease of setup, light weight, and low cost compared with competing technologies. An LCD is comprised of thousands of small picture elements, or "pixels", which are either "on", "off", or "partially on". An image is displayed by the LCD by the appropriate manipulation, usually by applying an electric field, on the individual pixels. In the case of a twisted nematic (TN) LCD, if a particular pixel is "on", then the phase, and thus the polarization, of a linearly polarized light ray will remain unchanged as it passes through the pixel. However, if the pixel is "off", then the light ray will be rotated, i.e., its phase will be modulated so that its polarization angle is changed by 90 degrees. If the pixel is "partially on", then the light ray will be rotated by less than 90 degrees. An "on" pixel can be designated to represent either black or white. If the "on" pixel is designated as black, then the "off" pixel is designated as white, and vice versa. A "partially on" pixel represents a shade of gray. Polarizers are then provided on the LCD so that the polarization state of the light passing through the pixel is converted into the appropriate amount of transmission (black, white, or gray).

In the case of a super twisted nematic (STN) LCD, the optical effect arises from birefringence effects so that "on", "off", and "partially on" pixels each have a characteristic birefringence color. If the "blue mode" is used, the "off" pixel will have a blue color while the "on" pixel will be cream colored. If the "yellow mode" is used, the "off" pixel will be yellow and the "on" pixel will be blue-gray. A film may be added between the STN LCD and one of its polarizers to neutralize the color of the display, i.e., to convert the color display to a black and white display.

Current LCD projection systems typically employ forced air or liquid cooling to protect the temperature sensitive liquid crystal material. Even when using "hot" or "cold" mirrors to substantially remove the infrared component from the illumination, the approximately 55–60% of the visible light absorbed by the first of two conventional dichroic polarizer heats the LCD laminated thereto. In many LCD projectors in which the lamp, LCD, electronics, and projection optics are incorporated into one compact unit, the first polarizer is not laminated to the LCD to reduce conductive heating of the LCD, but the polarizer itself must still be cooled. Furthermore, all LCD projection systems suffer from low light utilization (color LCDs being typically 3–5% transmissive), thus usually necessitating brighter lamps to deliver good screen illumination. However, brighter lamps not only increase cost and power consumption, they also exacerbate the heating problem described above.

SUMMARY OF THE INVENTION

Accordingly, the present invention includes a liquid crystal display projection system having a display panel which is more easily cooled, which has improved illumination, and which accepts a wider angle of light than presently available systems. The system includes a projection panel having an LCD with dichroic polarizers provided on both sides thereof A reflective prepolarizer is provided adjacent one of the dichroic polarizers. Light rays are directed through the reflective prepolarizer and on through the LCD and dichroic polarizers. In one embodiment, a quarter-wave plate is provided between the light source and reflective prepolarizer, and a reflector is provided behind the light source.

The reflective prepolarizer is preferably a multilayer optical polymeric film having several pairs of alternating layers. Each of the layer pairs exhibits a refractive index difference between the adjacent layers in a first direction in the plane of the reflective polarizer and exhibits essentially no refractive index difference between adjacent layers in a second direction in the plane of the reflective polarizer and orthogonal to the first direction. One such film has a plurality of alternating layers of semi-crystalline naphthalene dicarboxylic acid polyesters and another polymer. The dichroic polarizers are preferably secured to the display. The reflective prepolarizer is preferably secured to one of the dichroic polarizers. A condensing lens, such as a fresnel lens, may be provided between the reflective prepolarizer and the light source.

Another embodiment of the present invention includes an LCD projection system including a projection panel, light source, and reflector. The projection panel includes an LCD having a polarizer, such as a dichroic polarizer on one side and a reflective polarizer on the side facing the light source. A quarter-wave plate is secured to the reflective polarizer, which is similar to the reflective prepolarizer described above.

The present invention also includes an LCD panel including an LCD having a polarizer on one side and a reflective polarizer on the other, and having a quarter-wave plate secured to the reflective polarizer.

The invention is also directed toward an overhead projector including a projection lamp, a fresnel lens, a quarter-wave plate secured to the fresnel lens, and a reflecting polarizer (as described above) secured to the quarter-wave plate. This allows one to receive the benefits of the invention while using a standard LCD panel for projection.

In another embodiment, the invention is directed to an LCD projection system including an overhead projector, an adapter panel placed on the projector, and an LCD panel placed on the adapter panel. The adapter panel includes a quarter-wave plate and the reflecting polarizer described above. The adapter panel allows one to receive the benefits of the invention while using a standard projector and a standard LCD panel.

DETAILED DESCRIPTION

Figure 1:
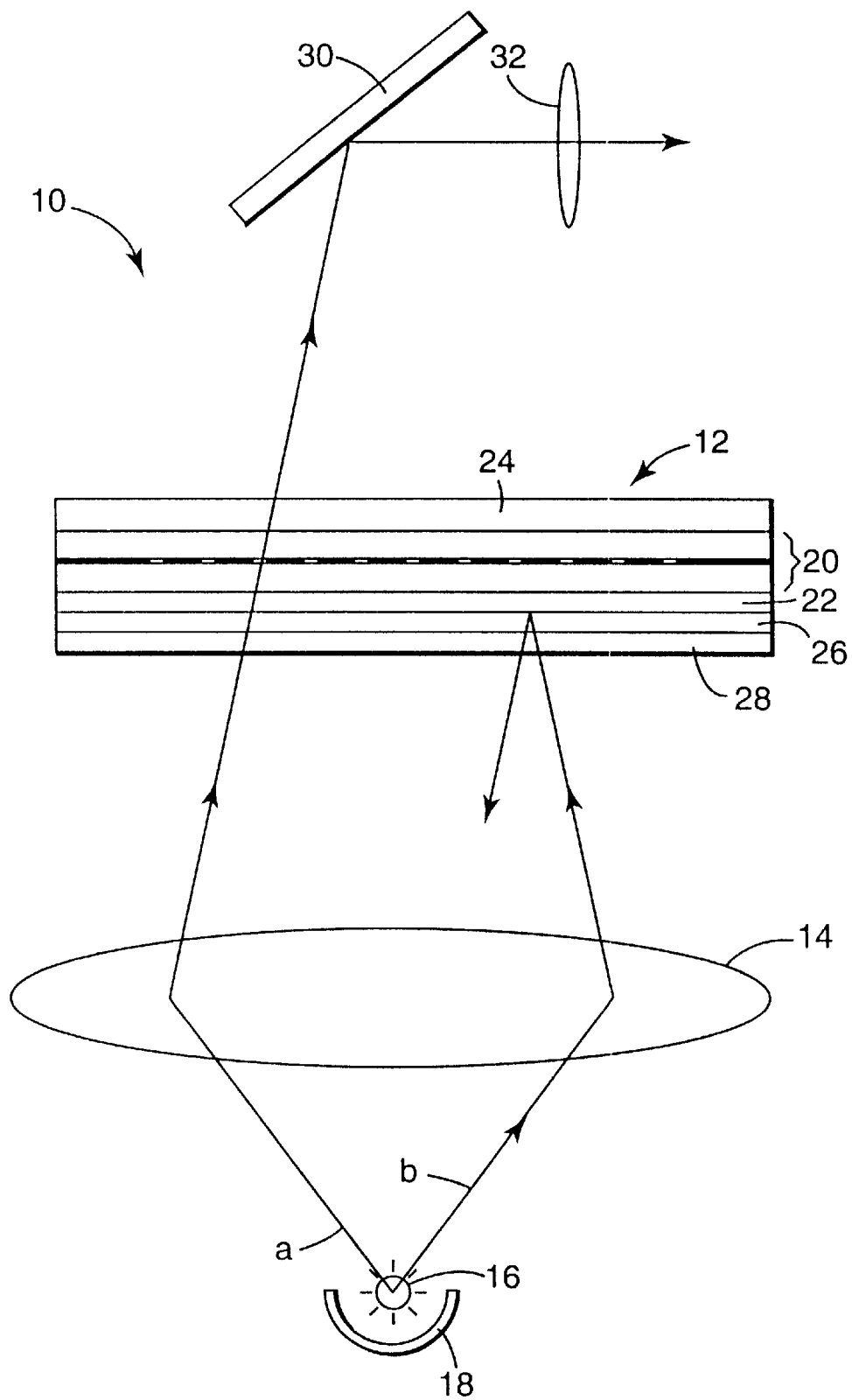
FIG. 1 is a schematic side view according to one embodiment of the present invention.

A liquid crystal display projection system according to the present invention is shown in FIG. 1. System 10 comprises a panel 12, converging lens 14, light source 16, optional reflector 18, optional mirror 30, and projection lens 32. Panel 12 comprises liquid crystal display (LCD) 20, first dichroic polarizer 22, second dichroic polarizer 24, reflecting prepolarizer 26, and optional quarter-wave plate 28. Dichroic polarizers 22 and 24 are provided on opposite sides of LCD 20. Prepolarizer 26 is positioned between first dichroic polarizer 22 and light source 16, and optional quarter-wave plate 28 is positioned between reflecting prepolarizer 26 and the light source. Let a be the polarization state that is passed by first dichroic polarizer 22. Reflecting prepolarizer 26 is also aligned so that it also passes a-polarized light.

Divergent light rays emitted from light source 16 are converged by converging lens 14. Light rays having a polarization a pass through reflecting prepolarizer 26 and first dichroic polarizer 22 and are then modulated, i.e., changed in phase, by the pixels in LCD 20, and then transmitted by the second dichroic polarizer 24 to the degree enabled by the phase change in the LCD. The light rays are then reflected by mirror 30 through projection lens 32 toward a viewing screen (not shown). Light rays having a polarization b perpendicular to polarization a are partially reflected by reflecting prepolarizer 26.

If reflecting prepolarizer 26 were an "ideal" polarizer, it would reflect 100% of light rays having b polarization, and would thus obviate the need for first polarizer 22. However, reflecting prepolarizer 26 is usually less than ideal--the polarization efficiency of prepolarizer 26 may be, for example, about 80%. Even if reflecting prepolarizer 26 is less than ideal, to the extent that the polarization efficiency is greater than zero, it contributes to reducing heat buildup within panel 12 by reducing the amount of light absorbed by first polarizer 22 (by reflecting some of the b polarized light before it reaches the first polarizer).

Figure 1A:
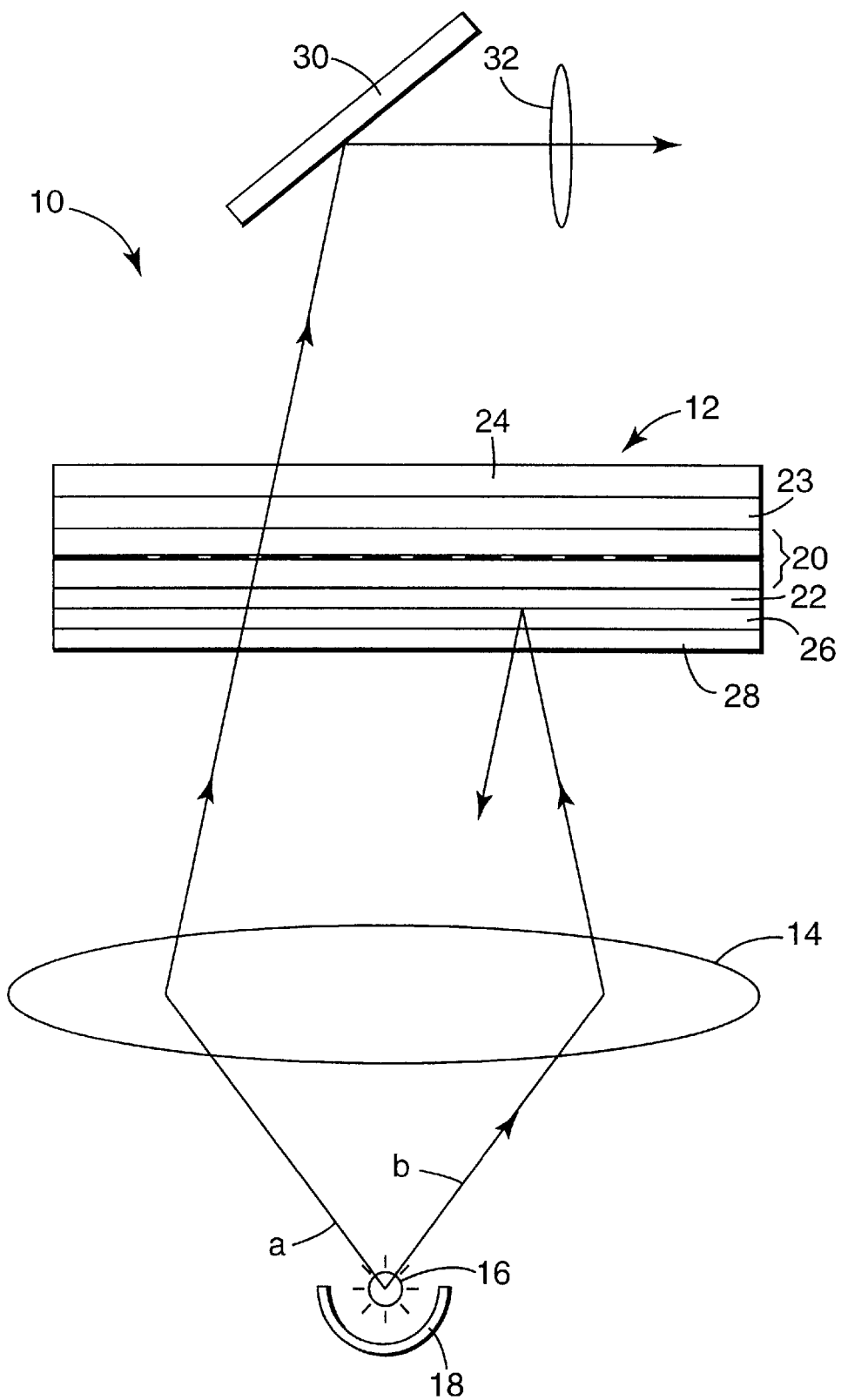
FIG. 1A is a schematic side view of the embodiment of FIG. 1 including a second reflecting polarizer.

The arrangement above is advantageous in that the amount of heat absorbed by first polarizer 22 and, thus, panel 12, is reduced. This is true even though the light rays passing through reflecting prepolarizer 26 are not parallel to each other, but rather are converging. Thus, only one converging lens element is needed. In an alternative embodiment, shown in FIG. 1A a second reflecting polarizer 23 may be provided between dichroic polarizer 24 and LCD 20.

However, as described above, light rays reflected by reflecting prepolarizer 26 may be wasted. These light rays may be "recycled" by placing a one-quarter wavelength (¼λ) plate 28 adjacent the side of reflecting prepolarizer 26 opposite LCD 20, with the optical axes of ¼λ plate 28 oriented at a 45° angle to the optical axes of prepolarizer 26 and by providing reflector 18 on the side of light source 16 opposite the panel. In this case, b-polarized light reflected by reflecting prepolarizer 26 becomes circularly polarized light of a certain handedness (right or left) after traversing ¼λ plate 28. When this circularly polarized light is reflected by reflector 18, it changes to circularly polarized light of the opposite handedness. When it again traverses ¼λ plate 28 in the forward direction, it becomes a-polarized linear light, and thus passes through reflecting prepolarizer 26 and first dichroic polarizer 22 to contribute to increased luminance of system 10.

Figure 2:
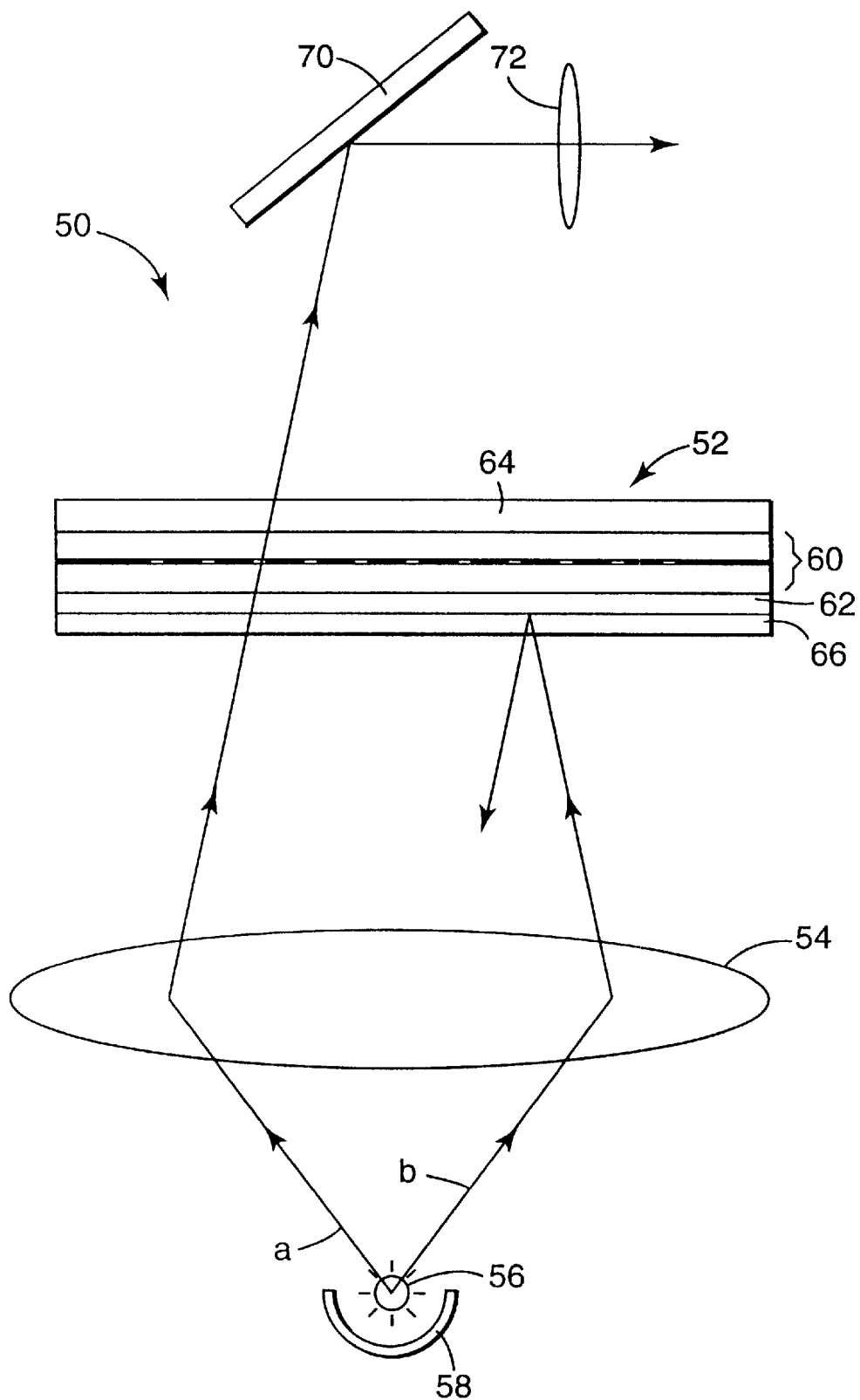
FIG. 2 is a schematic side view according to another embodiment of the present invention.

Another embodiment of a liquid crystal display projection system according to the present invention is shown in FIG. 2. System 50 comprises a panel 52, converging lens 54, light source 56, optional reflector 58, optional mirror 70, and projection lens 72. Panel 52 comprises LCD 60, dichroic polarizer 64, reflecting polarizer 62, and optional quarter-wave plate 66. Dichroic polarizer 64 and reflecting polarizer 62 are provided on opposite sides of LCD 60. Quarter-wave plate 66 is positioned between reflecting polarizer 62 and light source 56, with the optical axes of ¼λ plate 66 oriented at a 45° angle to the optical axes of reflecting polarizer 62.

Divergent light rays emitted from light source 56 are converged by converging lens 54. Light rays having a polarization a pass through quarter-wave plate 66 and reflecting polarizer 62, and are then modulated, i.e., changed in phase, by the pixels in LCD 60, and then transmitted by dichroic polarizer 64 to the degree enabled by the phase change in the LCD. Those light rays are then reflected by mirror 70 through projection lens 72 toward a viewing screen (not shown).

Light rays having a polarization b perpendicular to polarization a are reflected by reflecting polarizer 62, and become light rays of a certain handedness (right or left) after traversing ¼λ plate 66. As explained above, when this circularly polarized light is reflected by reflector 58, it changes to circularly polarized light of the opposite handedness. When it again traverses ¼λ plate 66 in the forward direction, it becomes a-polarized linear light, and thus passes through reflecting polarizer 62 to contribute to the increased illumination of system 50.

Figure 2A:
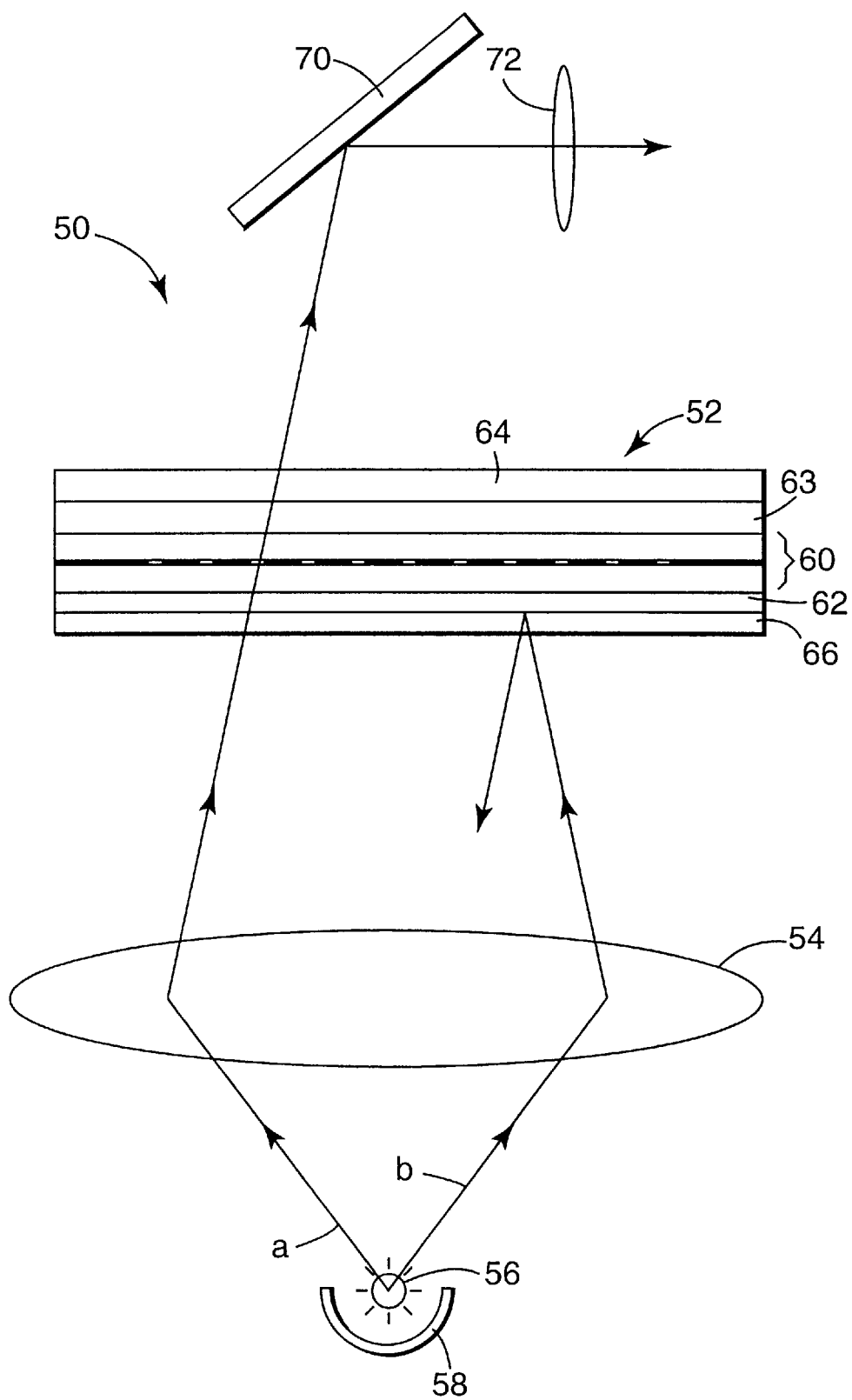
FIG. 2A is a schematic side view of the embodiment of FIG. 2 including a second reflecting polarizer.

In an alternative embodiment, shown in FIG. 2A a second reflecting polarizer 63 may be provided between dichroic polarizer 64 and LCD 60. In another embodiment, dichroic polarizer 64 may be replaced by a reflecting polarizer.

Figure 3:
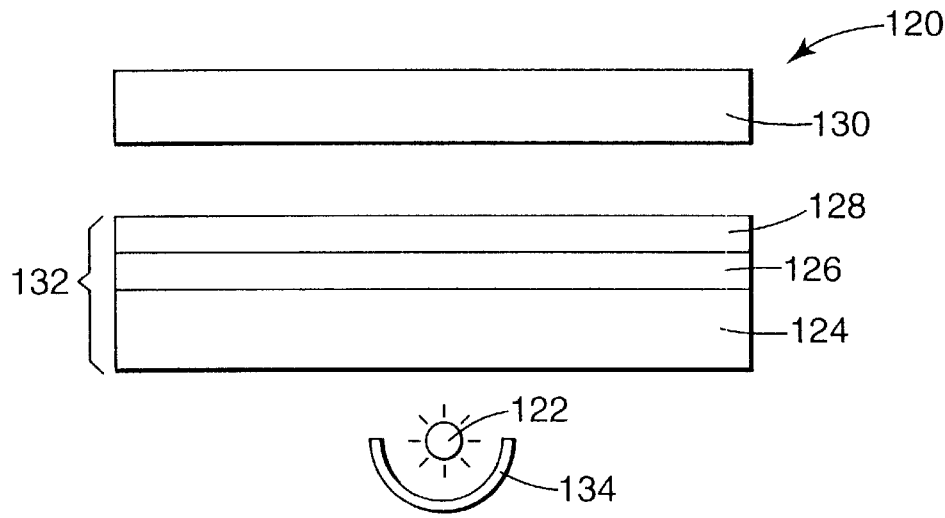
FIGS. 3–4 are schematic side views according to further embodiments of the present invention.

A third embodiment of the present invention is shown as projection system 120 in FIG. 3. System 120 is comprised of LCD panel 130 (which includes dichroic polarizers on each side of an LCD) and overhead projector 132. Projector 132 includes projection lamp 122, reflector 134, converging lens 124, quarter-wave plate 126, and reflecting polarizer 128, as shown in FIG. 3. Reflecting polarizer 128 and LCD panel 130 should be oriented so that the polarization axes of the reflecting polarizer and the dichroic polarizer in the LCD panel facing the reflecting polarizer are parallel. Reflecting polarizer 128 and quarter-wave plate 126 should be oriented so that their polarization axes differ by 45°.

System 120 is advantageous in that it allows for a standard LCD panel to be used with a projector made according to the present invention. And when a conventional transparency (instead of an LCD panel) is placed on the projector stage, the projector provides increased light transmission over projectors which have built-in dichroic polarizers.

Figure 4:
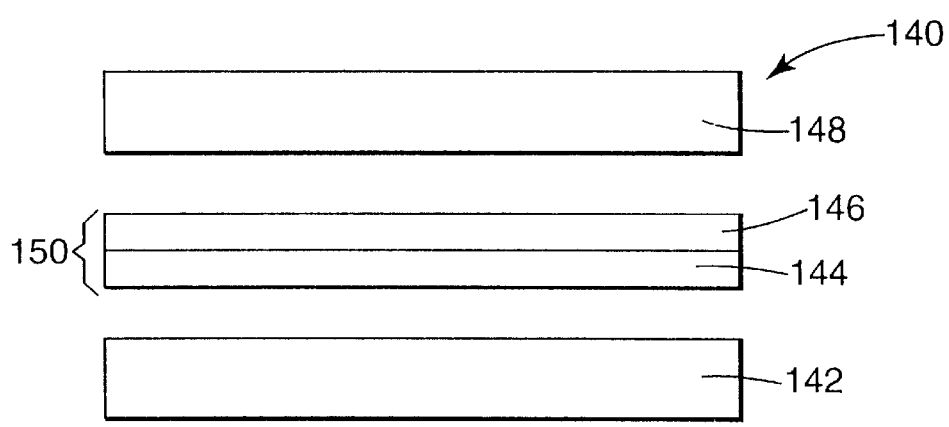

A fourth embodiment of the present invention is shown as projection system 140 in FIG. 4. System 140 is comprised of overhead projector 142, adapter panel 150, and LCD panel 148 (which includes dichroic polarizers on each side of an LCD). Adapter panel 150 is comprised of quarter-wave plate 144 and reflecting polarizer 146, as shown in FIG. 4, whose optical axes are at 45° with respect to each other. Reflecting polarizer 146, LCD panel 148, and quarter-wave plate 144 should be oriented in the manner discussed above for system 120. System 140 is advantageous in that it allows a standard LCD panel to be used with a standard projector due to the use of the adapter panel according to the present invention.

The LCDs in the above embodiments may be any type of polarization-dependent liquid crystal display, which may include two rigid or flexible substrates, such as plastic or glass. Polarizers 22, 24, and 64, as well as the polarizers included within LCD panels 130 and 148, are preferably absorbing dye-type dichroic polarizers and should be oriented with respect to each other so that liquid crystal display 20 or 60 operates in the desired mode (normally white or normally black). Converging lenses 14, 54, and 124 are preferably fresnel lenses comprising optical plastic such as cellulose acetate butyrate, polycarbonate, or acrylic. Overhead projector 142 preferably incorporates such a converging lens.

Light sources 16, 56, and 122, as well as the light source used in overhead projector 142, may be those typically used, such as incandescent or gas-discharge sources. Reflectors 18 and 58 and mirrors 30 and 70 are those typically used, such as metals or multilayer dielectrics. Reflectors 18 and 58 may be spherical or elliptical. Projection lenses 32 and 72 and quarter-wave plates 28, 66, 126, and 144 are also standard.

Figure 7:
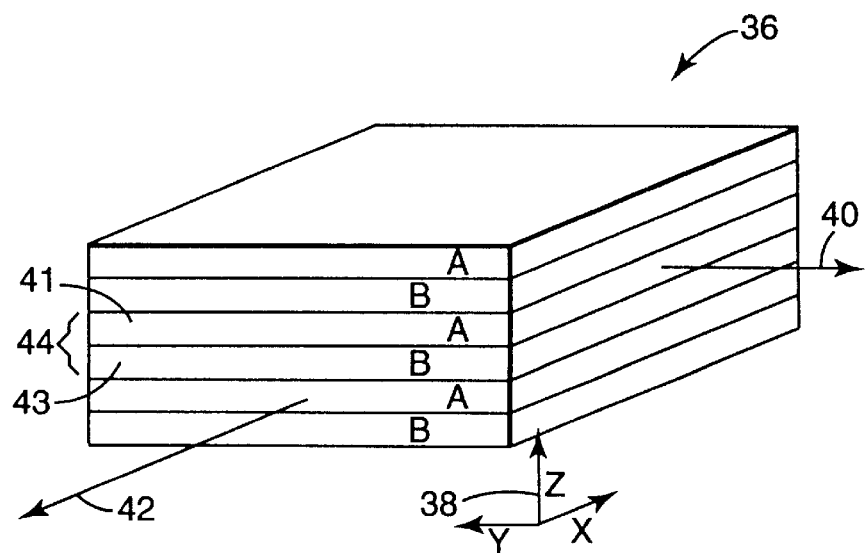
FIG. 7 is a schematic perspective view of the reflecting polarizer for use with the present invention.

FIG. 7 is a schematic perspective diagram of a segment of a preferred reflective polarizer 36 for use as a reflective polarizer in the present invention. FIG. 7 includes a coordinate system 38 that defines x, y and z directions. Reflective polarizer 36 is a multilayered stack of alternating layers of two different materials. The two materials are referred to as material "A" and material "B" in the drawing and description. Adjacent layers 41 and 43 of material A and material B comprise an exemplary layer pair 44. Layer pair 44 exhibits a refractive index difference between adjacent layers 41 and 43 associated with the x direction, and essentially no refractive index difference between layers 41 and 43 associated with the y direction.

In a preferred embodiment of the device of this invention, the reflective polarizers each comprise a multilayered sheet of alternating layers of materials A and B in which each of the layers has an average thickness of less than 0.5 μm. A layer of material A adjacent to a layer of material B comprises a layer pair. The number of layer pairs is preferably in the range from about 10 to 2000, and more preferably about 200 to 1000.

The multilayered sheet is formed by coextrusion of materials A and B into a sheet, followed by uniaxial stretching in the x direction. The stretch ratio is defined as the dimension after stretch divided by the dimension before stretch. The stretch ratio is preferably in the range from 2:1 to 10:1, more preferably 3:1 to 8:1, and most preferably 4:1 to 7:1, e.g., 6:1. The sheet is not appreciably stretched in the y direction. Material A is a polymeric material chosen to exhibit a stress-induced birefringence, or change in index of refraction with stretching. For example, a uniaxially stretched sheet of material A will have one index of refraction, $n_{Ax}$, associated with the stretch direction ($n_{Ax}$=1.88, for example) and a different index of refraction, $n_{Ay}$, associated with the transverse direction ($n_{Ay}$=1.64, for example). Material A exhibits a difference in index of refraction between the stretch and transverse directions ($n_{Ax}-n_{Ay}$) of at least 0.05, preferably at least 0.10, and more preferably at least 0.20. Material B is a material chosen such that its refractive index, $n_{By}$, is substantially equal to $n_{Ay}$ after the multilayer film is stretched. Upon stretching, the value of $n_{Bx}$ preferably decreases.

After stretching, the multilayered sheet of this embodiment shows a large difference in index of refraction between adjacent layers associated with the stretch direction (defined as $\Delta n_x = n_{Ax} - n_{Bx}$). In the transverse direction, however, the index of refraction difference between adjacent layers is substantially zero (defined as $\Delta n_y = n_{Ay} - n_{By}$). These optical characteristics cause the multilayered stack to act as a reflective polarizer that will transmit the polarization component of randomly polarized light that is parallel to transmission axis 40 shown in FIG. 7. The portion of light which is transmitted by reflective polarizer 36 is referred to as having polarization state a. The portion of light which does not pass through reflective polarizer 36 has polarization state b which corresponds to extinction axis 42 shown in FIG. 7. Extinction axis 42 is parallel to the stretch direction x. Therefore, b-polarized light encounters the index of refraction difference, $\Delta n_x$, which results in its reflection. The reflective polarizer is preferably at least 50% reflective of b-polarized light and more preferably at least 90%. The third refractive index differential, $\Delta n_z$, is important for controlling the off-axis reflectivity of the reflective polarizer. For high extinction ratios of the b-polarized light and high transmission of the a-polarized light, at large angles of incidence, it is preferred that $\Delta n_z = n_{Az} - n_{Bz} < 0.5 \Delta n_x$, more preferably less than 0.2 $\Delta n_x$, and most preferably less than 0.01 $\Delta n_x$.

The optical behavior and design of such reflective polarizers is described in more detail in Assignee's copending application, U.S. Ser. No. 08/402041, filed Mar. 10, 1995, entitled "Optical Film."

One of ordinary skill will be able to select materials appropriate to achieve the desired refractive index relationships. In general, Material A may be selected from a semi-crystalline polymeric material, such as a semi-crystalline naphthalene dicarboxylic acid polyester or polyethylene naphthalate (PEN) and isomers thereof (e.g., 2,6-, 1,4-, 1,5-, 2,7-, and 2,3-PEN). Material A may also be selected from other semi-crystalline polymer materials, such as polyethylene terephthalate (PET), polyethylene isophthalate (PEI), and copolymers of PEN, PET, and PEI. As used herein, coPEN includes copolymers of PEN and coPET includes copolymers of PET. Material B may be a semi-crystalline or amorphous polymeric material, such as syndiotactic polystyrene (sPS), and copolymers, e.g., coPEN, coPET, and copolymers of Eastar, which is polycyclohexanedimethylene terephthalate commercially available from Eastman Chemical Co. The coPEN described may also be a blend of pellets where at least one component is a polymer based on naphthalene dicarboxylic acid, and other components are other polyesters or polycarbonates, such as a PET, a PEN or a co-PEN. Materials A and B are preferably chosen to have similar Theological properties (e.g., melt viscosities) such that they can be coextruded.

The reflective polarizer is prepared by coextruding material A and material B to form a multilayered film and then orienting the film by stretching substantially in one direction (uniaxially) at a selected temperature, optionally followed by heat-setting at a selected temperature. The film may be allowed to dimensionally relax in the cross-stretch direction (orthogonal to the stretch direction) in the range from the natural reduction in cross-stretch dimension (equal to the square root of the stretch ratio) to no reduction in cross-stretch dimension (corresponding to complete constraint). The film may be stretched in the machine direction, as with a length orienter, or in the width direction, as with a tenter.

It will be apparent to one of ordinary skill to select a combination of process variables such as stretch temperature, stretch ratio, heat set temperature and cross-stretch relaxation, to yield a reflective polarizer having the desired refractive index relationship.

In a particularly preferred embodiment, the multilayered sheet comprises a stack of layer pairs of materials A and B as described above, in which the stack is divided into one or more segments of layer pairs. Each segment is designed to have maximum reflectivity of light having a given bandwidth by having layer pairs which each have a combined thickness of about one half of the wavelength in the center of the bandwidth for that segment. The combination of segments having different layer pair thicknesses allows the reflective polarizer to reflect light having a relatively large bandwidth.

For example, the multilayered sheet may include ten segments having layer pairs with a combined thickness ranging from 100 nm to 200 nm. Each segment may include between 10 and 50 layer pairs. This polarizer is capable of reflecting light having wavelengths in the range from 400 to 800 nm. Alternatively, the thicknesses of the layered pairs may be continuously graded from 100 to 200 nm The invention will now be described with reference to the following non-limiting examples. All measurements are approximate.

EXAMPLE 1

Figure 5:
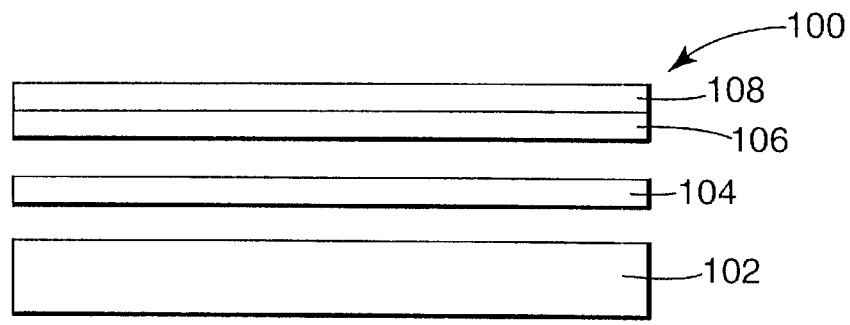
FIG. 5 is a schematic side view demonstrating how the brightness of a display according to the invention was measured.

The luminance gain obtained by the recycling feature of the present invention was measured by constructing a system 100, illustrated schematically in FIG. 5. System 100 was comprised of a projector 102, a quarter-wave plate 104 provided on the projector stage, a reflecting polarizer 106, and a dichroic polarizer 108, as shown in FIG. 5.

Quarter-wave plate 104 was a 12" by 12" (30×30 cm) 140 nm retardation film (i.e., for quarter-wave at 560 nm) from Polaroid Corporation, Norwood, Mass., U.S.A. Dichroic polarizer 108 was a 12" by 12" (30×30 cm) HN42 polarizer from Polaroid Corporation, Projector 102 was a standard transmissive overhead projector from 3M Company, St. Paul, Minn. (3M model 2150).

Reflecting polarizer 106 contained 601 layers and was produced by extruding the web and by orienting the film two days later on a tenter. Polyethylene naphthalate (PEN) with an intrinsic viscosity of 0.5 dl/g (60 wt. % phenol/40 wt. % dichlorobenzene) was delivered by one extruder at a rate of 75 pounds (34 kg) per hour and CoPEN (70 mole %, 2,6 NDC (naphthalene dicarboxylic acid), and 30 mole % DMT (dimethyl terephthalate)) with an intrinsic viscosity of 0.55 dl/g (60 wt. % phenol/40 wt. % dichlorobenzene) was delivered by another extruder at a rate of 65 pounds (30 kg) per hour. PEN was on the skin layers, which are coextruded as thick outer layers through the same feedblock and are folded in as both internal and external layers by the multipliers. Internal and external skins comprised 8% of the total thickness of the polarizer. The feedblock method was used to generate 151 layers which was passed through two multipliers producing an extrudate of 601 layers. U.S. Pat. No. 3,565,985 describes similar coextrusion multipliers. All stretching was done in the tenter. The film was preheated to about 280° F. (140° C.) in about 20 seconds and drawn in the transverse direction to a draw ratio of about 4.4 at a rate of about 6% per second. The film was then relaxed about 2% of its maximum width in a heat-set oven set at 460° F. (240° C.). The finished film thickness was 0.0018 inch (46 μm).

Figure 8:
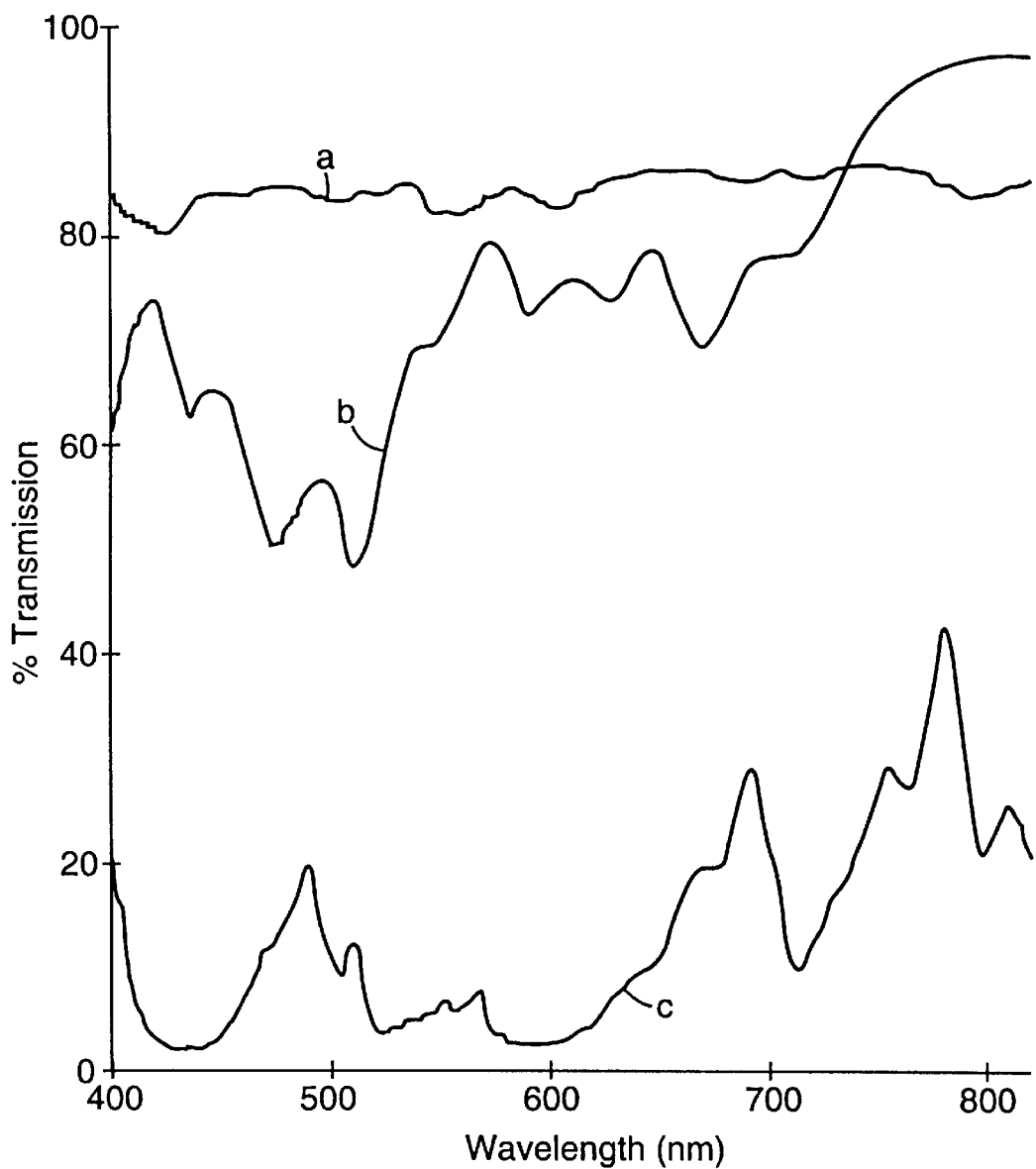
FIG. 8 shows the optical performance of the reflecting polarizer described in Example 1.

The transmission of the film is shown in FIG. 8. Curve a shows transmission of a-polarized light at normal incidence, curve b shows transmission of a-polarized light at 60° incidence, and curve c shows transmission of b-polarized light at normal incidence. Note the nonuniform transmission of a-polarized light at both normal and 60° incidence. Also note the nonuniform extinction of b-polarized light in the visible range (400–700 nm) shown by curve c.

Dichroic polarizer 108 and reflecting polarizer 106 were oriented so that their polarization axes were parallel and were placed atop quarter-wave plate 104, whose optical axes are at 45° to those of the polarizers. Light projected to the screen (optics and screen are not shown) was measured with a photometer.

The screen intensity for the case when the quarter-wave plate 104 was in the position described above was measured to be 15% higher than for the case when the λ/4 plate 104 was removed from system 100. In other words, insertion of the λ/4 plate in conjunction with the reflecting polarizer allows for use of 15% of the polarized light that would otherwise be lost without the use of the reflecting polarizer. This compares favorably with the 7% increase reported for systems using a microstructured MacNeille polarizer as the reflecting polarizer. See European patent application No. 0 573 905 A1, column 11, by Michael F. Weber, published Dec. 15, 1993, assigned to 3M Company. It is expected that a more sophisticated illumination system might increase this 15% recycling rate. Similarly, reflecting polarizers having improved performance such as those in Examples 3 and 4 would increase the recycling rate.

EXAMPLE 2

The arrangement shown in FIG. 5 was optically modeled to demonstrate angular dependence on incident light for two different reflective polarizers: a multilayer optical film and a microstructure MacNeille polarizer.

Figure 6:
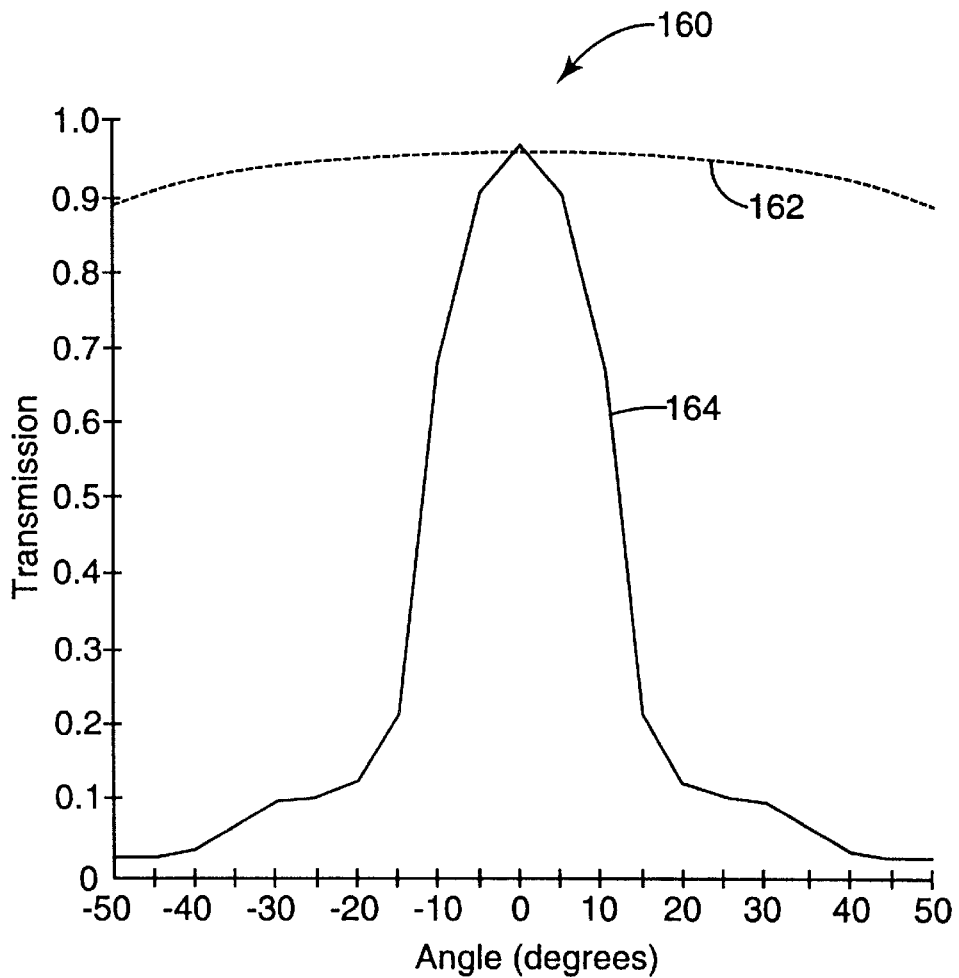
FIG. 6 is a graph generated by optical modeling showing the wide range of angular acceptance of the system shown in FIG. 5 according to the present invention.

The results of the optical modeling are shown as graph 160 in FIG. 6. The transmission of the desired polarization by the multilayer optical film was greater than 90% over a broad angular range of incident light from −45° to +45°. (See line 162 in FIG. 6.) In contrast, the transmission of the desired polarization by the MacNeille polarizer fell below 90% outside the narrow angular range from −5° to +5°. (See line 164 in FIG. 6.)

EXAMPLE 3

Another reflective polarizer for use in the present invention was constructed. The reflecting polarizer contained 603 layers and was made on a sequential, flat film-making line via a coextrusion process. Polyethylene naphthalate (PEN) with an intrinsic viscosity of 0.47 dl/g (in 60 wt % phenol plus 40 wt % dichlorobenzene) was delivered by an extruder at a rate of 83 pounds (38 kg) per hour and CoPEN was delivered by another extruder at 75 pounds (34 kg) per hour. The CoPEN was a copolymer of 70 mole %, 2,6 naphthalene dicarboxylate methyl ester, 15 mole % DMT, and 15 mole % dimethyl isophthalate with ethylene glycol. The feedblock method was used to generate 151 layers. The feedblock was designed to produce a gradient distribution of layers with a ratio of thicknesses of the optical layers of 1.22 for the PEN and 1.22 for the CoPEN. This optical stack was multiplied by two sequential multipliers. The nominal multiplication ratio of the multipliers was 1.2 and 1.4, respectively. Between the final multiplier and the die, skin layers were added composed of the same CoPEN described above, delivered by a third extruder at a total rate of 106 (48 kg) pounds per hour. The film was subsequently preheated to 300° F. (150° C.) in about 30 seconds, and drawn in the transverse direction to a draw ratio of approximately 6 at an initial rate of about 20% per second. The finished film thickness was approximately 0.0035 inch (89 μm).

Figure 9:
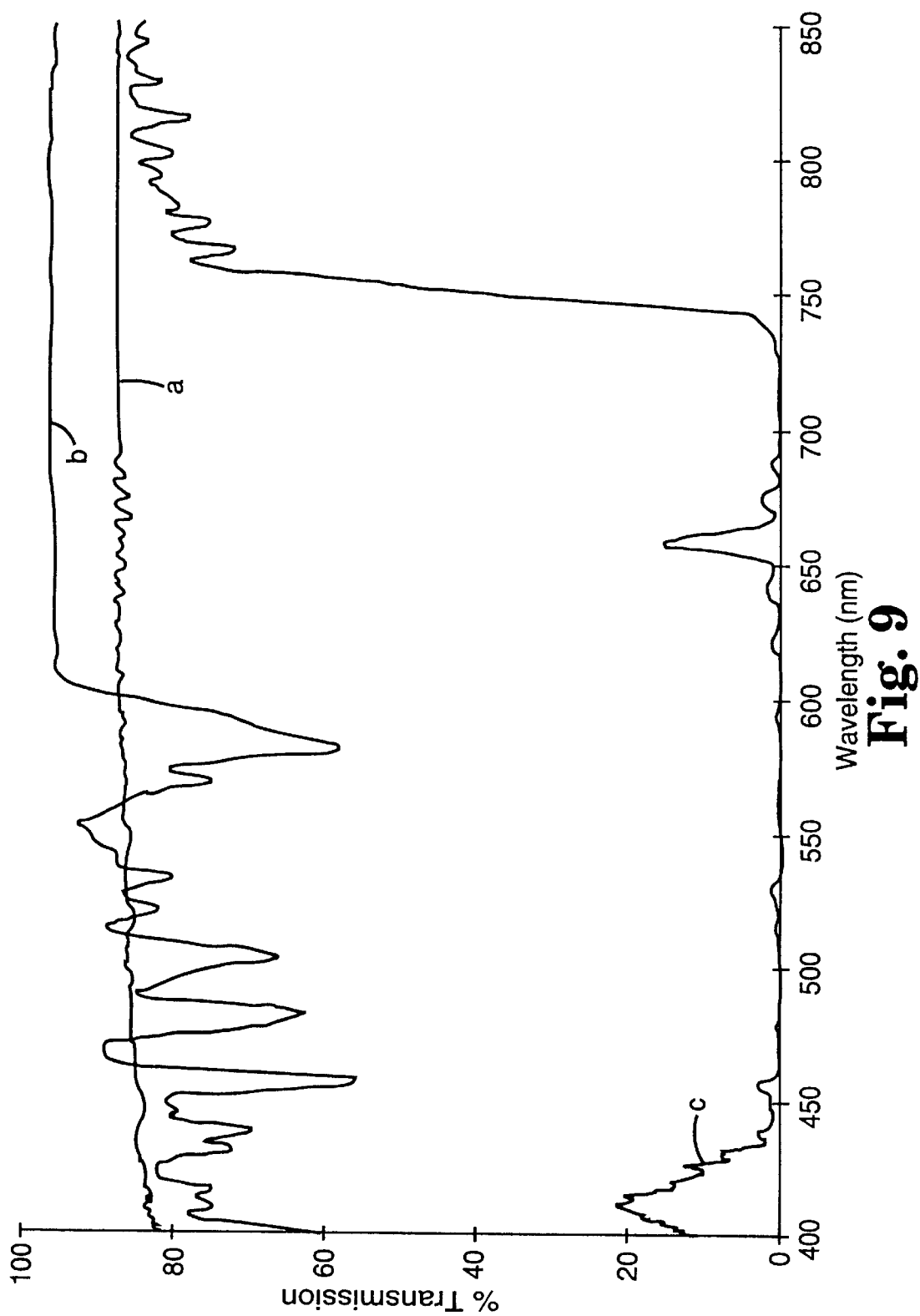
FIGS. 9 and 10 show the optical performance of the reflecting polarizers described in Examples 3 and 4, respectively.

FIG. 9 shows the optical performance of this reflecting polarizer. Curve a shows transmission of light polarized in the non-stretch direction at normal incidence, curve b shows transmission of light having both plane of incidence and plane of polarization parallel to the non-stretch direction at a 50° angle of incidence, and curve c shows transmission of light polarized in the stretch direction at normal incidence. Note the very high transmission of light polarized in the non-stretch direction. Average transmission for curve a over 400–700 nm is 87%. Also note the very high extinction of light polarized in the stretched direction in the visible range (400–700 nm) shown by curve c. The film has an average transmission of 2.5% for curve c between 400 and 700 nm. The % RMS color for curve b is 5%. The % RMS color is the root mean square of the transmissivity over the wavelength range of interest.

EXAMPLE 4

Yet another reflecting polarizer for use in the present invention was constructed. The reflecting polarizer comprised a coextruded film containing 481 layers made by extruding the cast web in one operation and later orienting the film in a laboratory film-stretching apparatus. The feedblock method was used with a 61 layer feedblock and three (2×) multipliers. Thick skin layers were added between the final multiplier and the die. Polyethylene naphthlate (PEN) with an intrinsic viscosity of 0.47 dl/g (60 wt. % phenol/40 wt. % dichlorobenzene) was delivered to the feedblock by one extruder at a rate of 25.0 pounds (11.4 kg) per hour. Glycol modified polyethylene cyclohexane dimethane terephthalate (PCTG 5445 from Eastman) was delivered by another extruder at a rate of 25.0 pounds (11.4 kg) per hour. Another stream of PEN from the above extruder was added as skin layers at a rate of 25.0 pounds per hour. The cast web was 0.007 inch (0.2 mm) thick and 12 inches (30 cm) wide. The web was uniaxially oriented using a laboratory stretching device that uses a pantograph to grip a section of film and stretch it in one direction at a uniform rate while it is allowed to freely relax in the other direction. The sample of web loaded was about 5.40 cm wide (the unconstrained direction) and 7.45 cm long between the grippers of the pantograph. The web was loaded into the stretcher at about 100° C. and heated to 135° C. for 45 seconds. Stretching was then commenced at 20% per second (based on original dimensions) until the sample was stretched to about 6:1 (based on gripper-to-gripper measurements). Immediately after stretching, the sample was cooled by blowing room temperature air at it. In the center, the sample was found to relax by a factor of 2.0.

Figure 10:
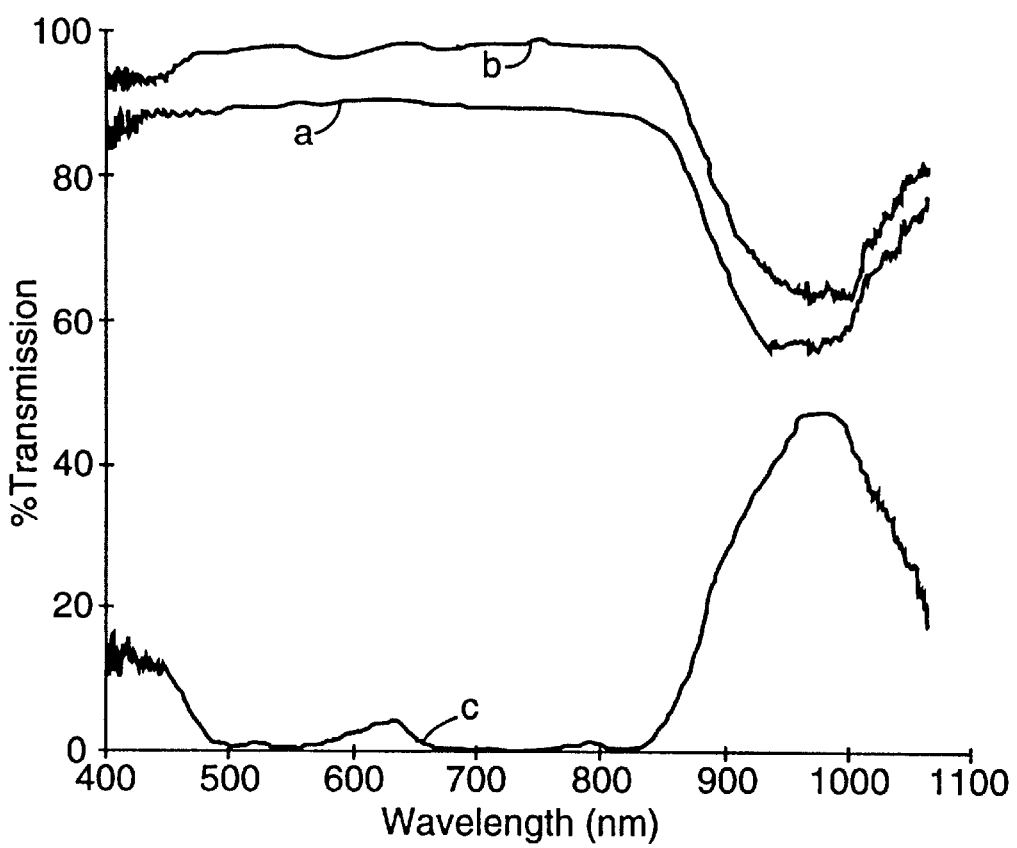

FIG. 10 shows the transmission of this multilayer film where curve a shows transmission of light polarized in the non-stretch direction at normal incidence, curve b shows transmission of light having both plane of incidence and plane of polarization parallel to the non-stretched direction at a 60° angle of incidence (p-polarized light), and curve c shows the transmission of light polarized in the stretch direction at normal incidence. Average transmission for curve a from 400–700 nm is 89.7%, average transmission for curve b from 400–700 nm is 96.9%, and average transmission for curve c from 400–700 nm is 4.0%. % RMS color for curve a is 1.05%, and % RMS color for curve b is 1.44%.

Although the present invention has been described with reference to an LCD panel provided between the projector and screen, those skilled in the art will appreciate that the present invention also includes the use of additional LCD panels, such as a total of three to achieve full color.

We claim:

1. A liquid crystal projector system, comprising:
    a light source;
    a liquid crystal light modulator;
    a reflective polarizer disposed between the light source and the light modulator, the reflective polarizer including layers of a first material and a second material having a refractive index difference between the first and second material along a first axis which is large enough to substantially reflect light of a first polarization state and a refractive index difference between the first and second material along a second axis, orthogonal to the first axis, which is small enough to substantially transmit light of a second polarization state;
    a reflector disposed to redirect light reflected by the reflective polarizer; and
    a retarder film disposed between the reflector and the reflective polarizer,
    wherein at least 15% of light of the first polarization state reflected by the reflective polarizer is converted to the second polarization state and redirected for transmission to the light modulator by the reflector and retarder film.

2. The system of claim 1 wherein the first and second material comprise layers of semi-crystalline naphthalene dicarboxylic acid polyesters and another polymer.

3. The system of claim 1, further comprising a condensing lens provided between the light source and reflective prepolarizer.

4. A liquid crystal display projection system as claimed in claim 1, wherein the refractive index difference along the first axis exceeds the refractive index difference along the second axis by at least 0.05.

5. A liquid crystal display projection system as claimed in claim 1, wherein the refractive index difference along the first axis exceeds the refractive index difference along the second axis by at least 0.10.

6. A liquid crystal display projection system as claimed in claim 1, wherein the refractive index difference along the first axis exceeds the refractive index difference along the second axis by at least 0.20.

7. A liquid crystal display projection system as claimed in claim 1, wherein the first material of the reflective polarizer exhibits stress-induced birefringence, the materials of the reflective polarizer being uniaxially stretched.

8. A liquid crystal display projection system as claimed in claim 7, wherein the first material is a napthalene dicarboxylic acid polyester and the second material is selected from the group consisting of polystyrene, polyethylene napthalate, polyethylene terepthalate and cyclohexanedimethylene terepthalate.

9. A liquid crystal display projection system as claimed in claim 7, wherein the first material is selected from the group consisting of polyethylene naphthalate, polyethylene terepthalate, polyethylene isopthalate, and copolymers thereof.

10. A liquid crystal display projection system as claimed in claim 1, wherein a refractive index difference between the first and second material along a third axis orthogonal to a plane of the reflective polarizer is less than about 0.2 times the refractive index difference between the two materials along the first axis.

11. A liquid crystal display projection system as claimed in claim 1, wherein a refractive index different between the first and second materials along a third axis orthogonal to a plane of the reflective polarizer is less than about 0.1 times the refractive index difference between the two materials along the first axis.

12. A liquid crystal projector as recited in claim 1, further comprising a dichroic polarizer disposed between the reflective polarizer and the light modulator.

13. The system of claim 12, wherein the reflective polarizer is secured to the dichroic polarizer.

14. A liquid crystal projector as recited in claim 1, further comprising a second reflective polarizer disposed in the light path following the light modulator, the second reflective polarizer including layers of a third material and a fourth material having a refractive index difference between the third and fourth material of the second reflective polarizer along a first axis which is large enough to substantially reflect light of one of the first and second polarization and a refractive index difference between the third and fourth material of the second reflective polarizer along a second axis orthogonal to the first axis which is small enough to substantially transmit light of the other of the first and second polarization state.

15. A liquid crystal projector as recited in claim 14, further comprising a second dichroic polarizer disposed in the light path following the second reflective polarizer.

16. A liquid crystal projector as recited in claim 1, further comprising a dichroic polarizer disposed in the light path following the light modulator.

17. A liquid crystal projector as recited in claim 1, wherein the retarder film comprises a ¼-wave retarder.

18. A liquid crystal projection as recited in claim 1, further comprising a projection lens disposed to receive light transmitted through the light modulator.

19. The projector system of claim 1, further comprising a converging lens disposed between the light source and the reflective polarizer.

* * * * *